UNITED STATES PATENT OFFICE.

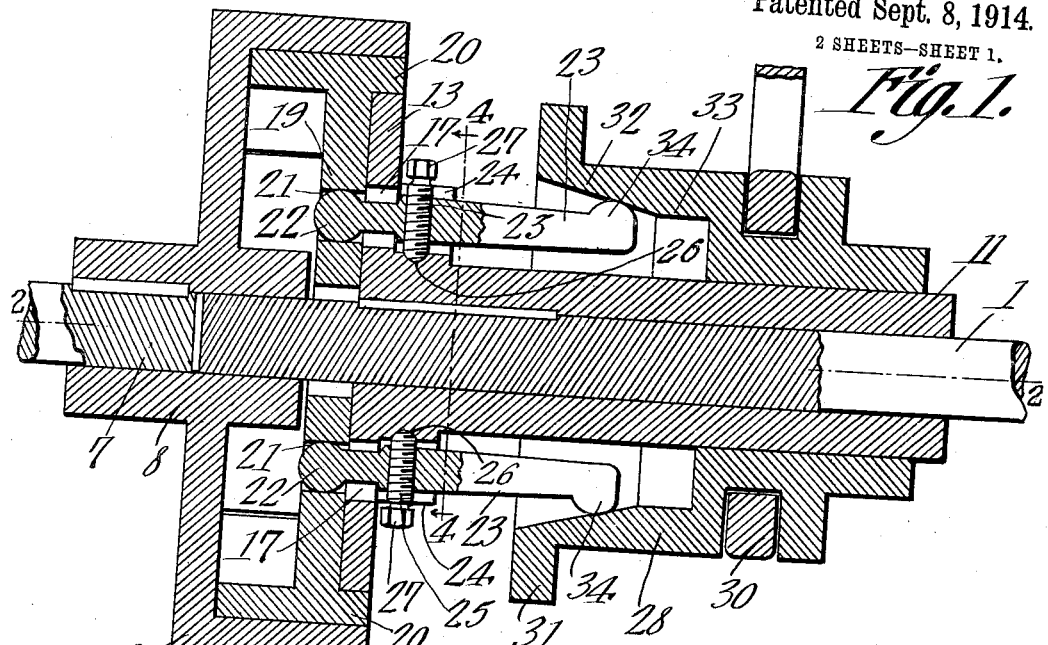
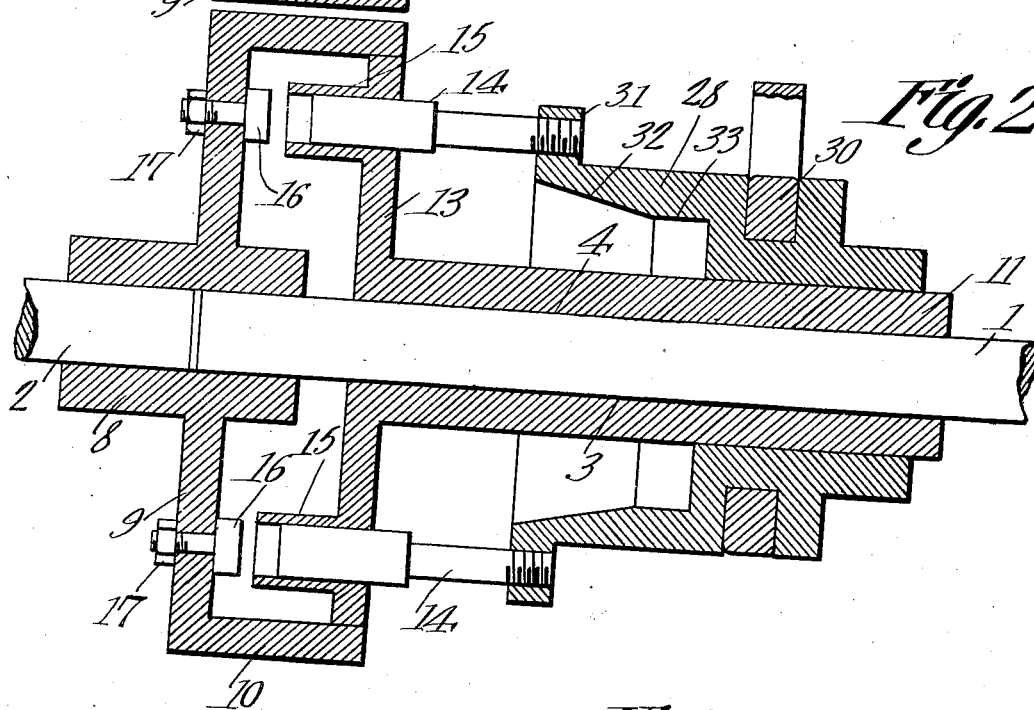

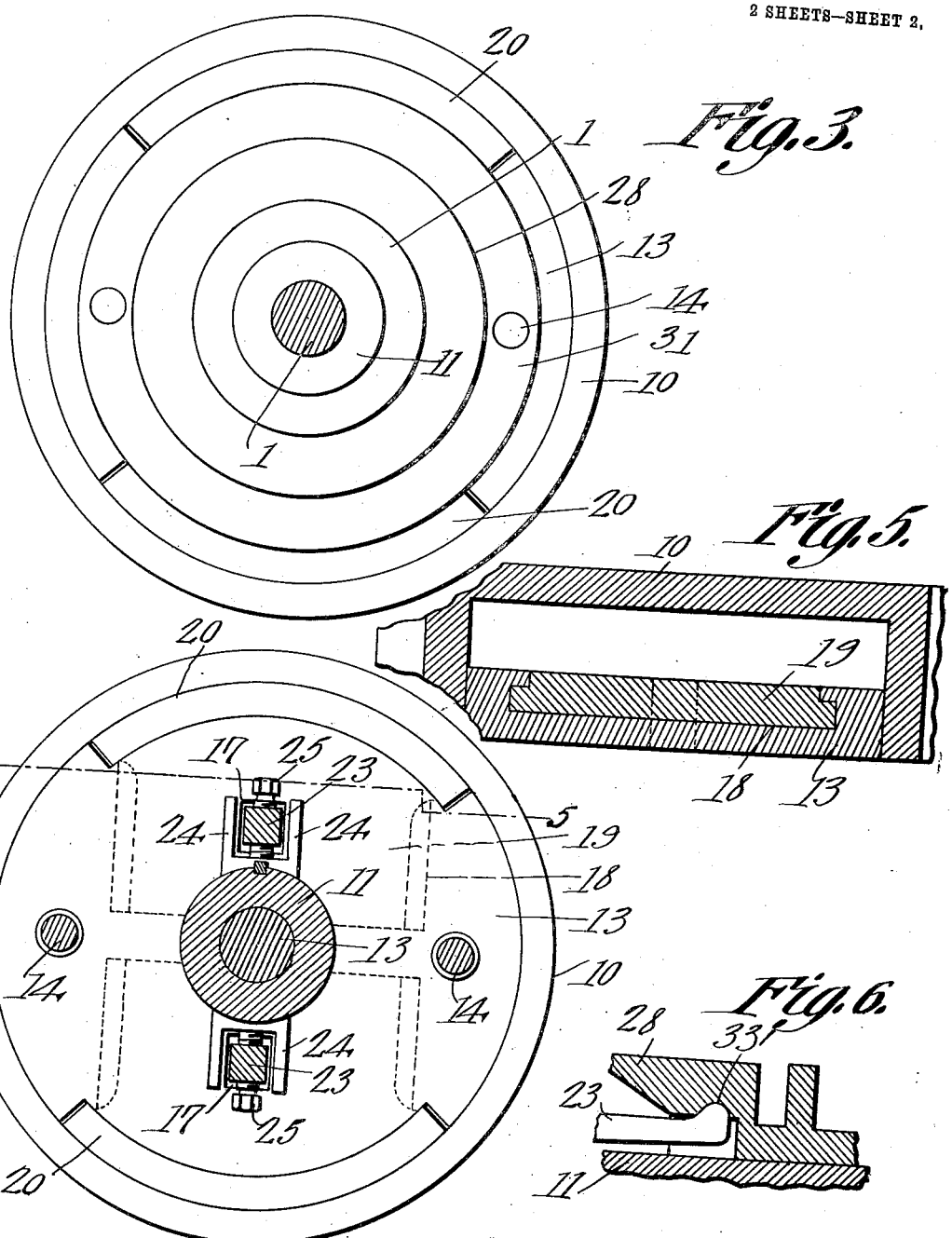

VICTOR R. KOONTZ, OF WAYNESBORO, PENNSYLVANIA.

CLUTCH.

1,110,212.

Specification of Letters Patent. Patented Sept. 8, 1914.

Application filed March 21, 1913. Serial No. 756,039.

*To all whom it may concern:*

Be it known that I, VICTOR R. KOONTZ, a citizen of the United States, residing at Waynesboro, in the county of Franklin and State of Pennsylvania, have invented a new and useful Clutch, of which the following is a specification.

The present invention relates to improvements in clutches, one object of the invention being the provision of a clutch especially adapted for connecting the driving to the driven shaft, the axes of which are in the same alinement, said clutch being so constructed that the movable member carried by the driving shaft first engages the clutch member of the driven shaft, the driving and driven clutch members being provided with driven clutch members being provided with coöperable means whereby at the final movement of the clutching mechanism, the two shafts are fixedly connected through a part of each clutch member so that there is no lost movement in transmitting from one shaft to the other even should the friction grip between the clutch members slide.

A further object of the present invention is a novel means for mounting the operating arms of the clutch member so that the friction grip of said clutch member may be readily adjusted.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a longitudinal sectional view taken through the complete clutch and shaft, showing the movable member in intermediate retracted position, the same being in position thereto, for connecting the driving to the driven member of the clutch. Fig. 2 is a section taken on the line 2—2 of Fig. 1. Fig. 3 is an end elevation of the complete clutch taken from the right end view in Fig. 1. Fig. 4 is a section taken on line 4—4 of Fig. 1. Fig. 5 is a section taken on line 5—5 of Fig. 4. Fig. 6 illustrates a modified form of means for actuating the levers.

Referring to the drawings, the numeral 1 designates the driving and 2 the driven shaft, the ends of which are disposed in a close proximity, as clearly shown in Figs. 1 and 2.

Keyed upon and rotatable with the driven shaft 2, is a sleeve 8, which has formed therewith, a disk or rim 9, which with the peripheral flange 10 constitutes the clutch drum of the shaft 2.

Upon one end of the sleeve 11, which is keyed to the shaft 1, is carried a disk 13, the disk 13 having disposed therein at diametrically opposite points the guide rod or pins 14, which are disposed within the sleeve 15 and for sliding movement to have their inner ends coöperate at the proper time with the studs 16 held in place by the nuts 17, and carried by the disk 9.

Upon the opposite face of the disk 13 are provided the two recesses 18, the shape of which is clearly illustrated in Fig. 5, and disposed for sliding movement within the respective recesses 18 are the two plates 19, one of which carries upon its outer end the segmental friction or clutch plate 20, each plate being disposed to engage the inner periphery of the drum 10 when the plates 19 are projecting to thus connect the clutch member carried by the driving shaft 1 to the clutch member of the driven shaft 2. Each of the arms 19 are provided with the apertures 21 through which is disposed the rounded head 22 of the actuating lever 23. Each of these levers, as clearly shown in Fig. 1, is disposed between the fixed and spaced lugs 24, of the sleeve 11 adjacent the disk 13 and upon each side of the elongated slot 17; and adjustably connected therein is the adjusting pin or screw 25, whose inner end is disposed to ride within the rounded recess 26 formed upon the sleeve 11, which provides a rocking fulcrum for the lever 23 to retract and project the plate 20, as will presently appear. The screw 25 is provided with the wrench receiving end 27, whereby the screw may be adjusted to regulate the tension and action of the plates 19 and 20 and consequently the gripping effect thereof upon the drum 10.

The clutch actuating drum 28 is mounted for sliding movement upon the sleeve 11.

A yoke 30 of usual structure is provided for moving the clutch member 28 to and from the disk 13, while secured fixedly within the flange or rim 31 of the member 28 are the two guide pins 14 which prevent the rotation of the member 28 independently of the disk 13.

From the foregoing description, taken in connection with the drawings, the operation of the present invention is readily understood, but briefly stated it is as follows:

Assuming the member 28 is moved with its casing to the right as shown in Fig. 1, and the member 28 has actuated the lever 23 so as to retract the plates 19 and it is desired to connect the clutch member 28 through the yoke 30, the member 28 is moved to the left so that the free end 34 of the levers 23 will slide inwardly upon the inclined face 32 and thus gradually project the plates 20 into engagement with the drum 10 of the driven shaft carrying member 9. This action connects the clutch member so that the driving shaft rotates the driven shaft.

A continued movement of the member 28, which brings the end 34 of the lever 23 into the cylindrical socket 33, the member 28 being moved sufficiently forward to cause the pins 14 to be moved to have their free ends placed in the path to engage the studs 16. Thus the pins 14 and studs 16 are circumferentially alined and should there be a slight sliding engagement at the plates 20, such pins and studs abutting will hold the plates against further sliding and the shafts will be rotated in unison.

If so desired, the recess 33' may be provided so that the arms 33 will be slightly released when the bar 4 has been forced over, so that the levers 23 will release the clutch plate 20 and thus disconnect the same from the drum 10 so that no pressure is exerted at this point and the friction at this point is reduced when the shafts 1 and 2 are directly connected. This structure is illustrated in Fig. 6.

What is claimed is:

1. A clutch, including two shafts disposed in axial alinement, a drum constituting one clutch member keyed upon and rotatable with one shaft, a sleeve having a disk keyed upon and rotatable with the second shaft, a plurality of radially disposed clutch members carried by said disk for engagement with the clutch member of the first shaft, levers carried by the sleeve, a sliding lever actuating member carried by the sleeve, said levers being connected to the sleeve by an adjustable connection whereby the gripping action of the members may be regulated, and coöperable means carried by both clutch members and operably connected to the sliding lever actuating member for directly connecting the shafts.

2. A clutch, including two shafts disposed in axial alinement, a drum constituting one clutch member keyed upon and rotatable with one shaft, a sleeve having a disk keyed upon and rotatable with the second shaft, a plurality of radially disposed clutch members carried by said disk for engagement with the clutch member of the first shaft, levers carried by the sleeve, a sliding lever actuating member carried by the sleeve, said levers being connected to the sleeve by an adjustable connection whereby the gripping action of the member may be regulated, and coöperable means carried by the drum and disk and operably connected to the sliding lever actuating member for directly connecting the shafts after the lever actuating member has been actuated to its full extent.

3. A clutch, including two shafts disposed in axial alinement, a drum constituting one clutch member keyed upon and rotatable with one shaft, a sleeve having a disk keyed upon and rotatable with the second shaft, a plurality of radially disposed clutch members carried by said disk for engagement with the clutch member of the first shaft, a plurality of levers, one lever to each clutch member carried by the sleeve, a sliding lever actuating member carried by the sleeve, each lever being connected intermediate of its ends to the sleeve by an adjustable connection whereby the gripping action of the clutch members may be regulated, the lever actuating member having a socket for receiving one end of each lever, said socket having an inclined wall terminating in a reduced cylindrical end for engaging the ends of the levers to operate said levers, and coöperable means carried by the drum and disk and operably connected to the lever actuating member to connect the shafts directly, said means coöperating when the ends of the levers are projected into the cylindrical end of the socket.

In testimony that I claim the foregoing as my own, I have hereto affixed my signature in the presence of two witnesses.

VICTOR R. KOONTZ.

Witnesses:
S. G. CUNNINGHAM,
T. S. CUNNINGHAM.